United States Patent [19]

Hudgens

[11] Patent Number: 4,613,755

[45] Date of Patent: Sep. 23, 1986

[54] METHOD OF MASS SPECTROMETRY

[75] Inventor: Jeffrey W. Hudgens, Washington, D.C.

[73] Assignee: The United States of America as represented by the Secretary of the Navy, Washington, D.C.

[21] Appl. No.: 506,090

[22] Filed: Jun. 20, 1983

[51] Int. Cl.⁴ .............................................. B01D 59/44

[52] U.S. Cl. ................................ 250/282; 250/423 P; 250/423 R; 250/424

[58] Field of Search ............... 250/282, 423 P, 423 R, 250/424

[56] References Cited

U.S. PATENT DOCUMENTS

| | | | |
|---|---|---|---|
| 3,521,054 | 7/1970 | Webb | 250/41.9 |
| 3,740,552 | 6/1973 | Pressman | 250/41.9 SE |
| 3,974,390 | 8/1976 | Morito et al. | 250/282 |
| 4,000,420 | 12/1976 | Harris | 250/282 |
| 4,044,252 | 8/1977 | Rentzepis | 250/282 |
| 4,085,332 | 4/1978 | Fletcher | 250/258 |
| 4,140,905 | 2/1979 | Polanyi | 250/281 |
| 4,176,025 | 11/1979 | Chen et al. | 204/157.1 R |
| 4,206,350 | 6/1980 | McKinned | 250/282 |
| 4,502,676 | 11/1981 | Levin et al. | 250/282 |

OTHER PUBLICATIONS

Tedder et al., "Charge-Exchange Mass Spectrometry", J. Phys. D. Appl. Phys. 13 (1980) 1949-S6.

*Primary Examiner*—Norman Morgenstern
*Assistant Examiner*—Janyce A. Bell
*Attorney, Agent, or Firm*—Robert F. Beers; Sol Sheinbein; Barry A. Edelberg

[57] ABSTRACT

Ions of a particular gas in a mixture of gases are made for mass spectrometry purposes by selectively electronically exciting the target gas and allowing the excited target gas to undergo a charge-exchange reaction with a reagent ion.

14 Claims, No Drawings

METHOD OF MASS SPECTROMETRY

FIELD OF THE INVENTION

This invention relates generally to charge-exchange mass spectrometry and more specifically to charge exchange mass spectrometry in a mixture of gases.

BACKGROUND OF THE INVENTION

Charge exchange ion-molecule reactions are used as an ion source for mass spectrometry. Present charge-exchange (electron transfer) mass spectrometry techniques are discussed in Tedder et al., "Charge Exchange Mass Spectrometry", J. Phys. D: Appl. Phys. 13, (1980) 1949–56, incorporated herein by reference. These reactions generally proceed according to the equation:

$$X^{+}+BC \rightarrow X+BC^{+}, \quad (1)$$

where $X^+$ is the molecular or atomic ion and BC is a molecule, radical, or atom which is to be ionized. Henceforth, $X^+$ is referred to as the reagent ion and BC as the target species. A requirement for reaction (1) to proceed is that the ionization potential of BC must be less than the electron affinity of $X^+$.

In the currently used charge-exchange mass spectrometers, reagent ions are produced by electron impact in a primary ion source. These ions are mass selected to obtain the desired reagent ion. The selected reagent ion is accelerated into the target gas to induce the charge-exchange reaction. A mass spectrometer oriented at right angles to the reagent gas velocity direction analyzes the charge-exchange reaction products.

A limitation of this technique is revealed when the target gas to be analyzed is in a mixture of other gases also in the target gas region. The desired gas is BC and the other gases are EF and GH. Their ionization potentials increase in the order EF, GH and BC. In this case the reagent ion used to ionize BC will also ionize EF and GH which can complicate analysis and reduce sensitivity for BC. In this case, gas chromatography must be used to separate BC from EF and GH. This step requires time.

Another standard practice is to select different reagent ions for optimal sensitivity for each component in the gas mixture, EF. GH, and BC. That technique, however, can require an inordinately large variety of reagent ions.

OBJECTS OF THE INVENTION

It is an object of the present invention to provide a simple process for the mass spectrometric analysis of a particular gas in a mixture of gases.

It is another object of this invention to provide a process for the mass spectrometric analysis of a particular gas in a mixture of gases without the need for prior chromatographic separation of the gases.

It is a further object of this invention to provide a general process for the mass spectrometric analysis of a particular gas in a mixture of gases which does not require a large inventory of reagent ions.

SUMMARY OF THE INVENTION

These and other objects are achieved in the present invention by selectively electronically exciting a target gas in a mixture of gases, thus allowing a charge-exchange reaction to occur between the excited target gas and the reagent ion, to thereby form the ion of the target gas. This newly formed ion may then be analyzed by well known mass spectrometry techiques.

DESCRIPTION OF THE PREFERRED EMBODIMENTS

To carry out the process of this invention, a mixture of gases, EF, GH, . . . , including BC, the target gas, are placed in the targt gas zone of a charge exchange mass-spectrometer. A reagent ion, $X^+$, is selected so that the electron affinity of $X^+$ is less than the ionization potential of BC, EF, GH . . . The target zone is irradiated with light, preferably from a laser, of an appropriate wavelength, so as to selectively induce a single- or multi-photon electronic transition of BC to form an excited state, $BC^*$, wherein the ionization potential of $BC^*$ is less than the electron affinity of $X^+$. Thus, upon collision with $BC^*$, $X^+$ undergoes a charge-exchange reaction with $BC^*$ to yield $BC^+$ and X. $BC^+$ may then be mass spectroscopically analyzed by known techniques.

Typically, the wavelengths necessary for electronic excitation of a target gas range from about 900 to 120 nm. Preferably, $X^+$ should be selected so as to have a large cross-section for charge-exchange reactions. Examples of ions having a large cross-sections for ion-exchange reactions are cesium and sodium. Of course, $X^+$ can also be an ionized molecule.

The current invention offers several advantages over prior art techniques of charge-exchange mass spectrometry of gaseous mixtures. Only the optically excited target gas is ionized, even in the presence of other gases. Thus noise from interfering charge-exchange reactions is eliminated. Also, there is no need for prior chromatographic separation of the target gas from the other gases in the mixture. Further, since the optimal detection of the target gas does not, otherwise than as previously stated, depend upon the reagent ion $X^+$, a smaller inventory of gases to make reagent ions is required. Finally, the technique allows analysis of several gases in a mixture merely by changing the wavelength of the exciting light.

Obviously, many modifications and variations of the present invention are possible in the light of the above teachings. For example, an incandescent, fluorescent or arc lamp equipped with filters may be used, rather than a laser, to electronically excite the target gas. It is therefore to be understood that, within the scope of the appended claims, the invention may be practiced otherwise than as specifically described.

What is claimed and desired to be secured by Letters Patent of the United States is:

1. A method of producing ions of a target gas, BC, in a mixture of gases, the steps of which comprise:

selecting a reagent ion $X^+$ so that the electron affinity of $X^+$ is less than the ionization potential of any of the gases in said mixture, including BC;

selectively inducing an electronic transition of BC to an excited electronic state to produce $BC^*$ so that the ionization potential of $BC^*$ is less than the electron affinity of $X^+$;

colliding $X^+$ with $BC^*$ to produce $BC^+$ in accordance with the charge-exchange reaction:

$$X^{+}+BC^{*} \rightarrow X+BC^{+}.$$

2. The method of claim 1 wherein said inducing step comprises the step of inducing said electronic transition of BC to said excited state by means of light having a wavelength of about 900 to 120 nm.

3. The method of claim 2 wherein said inducing step comprises the step of laser-inducing said electronic transition of BC to said excited state.

4. The method of claim 2 wherein said inducing step comprises the step of inducing said electronic transition of BC to said excited state by means of a incandescent lamp equipped with an appropriate filter.

5. The method of claim 2 wherein said inducing step comprises the step of inducing said electronic transition of BC to said excited state by means of a fluorescent light equipped with an appropriate filter.

6. The method of claim 2 wherein said inducing step comprises the step of inducing said electronic transition of BC to said excited state by means of an arc lamp equipped with an appropriate filter.

7. A method of producing ions of a target gas, BC, in a mixture of gases for mass-spectroscopic analysis, the steps of which comprise:

selecting a reagent ion, $X^+$, from the group consisting of cesium and sodium cations so that the electron affinity of $X^+$ is less than the ionization potential of any of the gases in said mixture, including BC;

selectively inducing an electronic transition of BC to an excited electronic state to produce $BC^*$ so that the ionization potential of $BC^*$ is less than the electron affinity of $X^+$;

colliding $X^+$ with $BC^*$ to produce $BC^+$ in accordance with the charge-transfer reaction:

$$X^+ + BC^* \rightarrow X + BC^+.$$

8. A method of spectroscopically analysing a target gas, BC, in a mixture of gases, the steps of which comprise:

selecting a reagent ion, $X^+$, so that the electron affinity of $X^+$ is less than the ionization potential of any of the gases in said mixture, including BC;

selectively inducing an electronic transition of BC to an excited electronic state to produce $BC^*$ so that the ionization potential of $BC^*$ is less than the electron affinity of $X^+$;

colliding $X^+$ with $BC^*$ to produce $BC^+$ in accordance with the charge-transfer reaction:

$$X^+ + BC^* \rightarrow X + BC^+;$$

mass-spectroscopically analysing $BC^+$.

9. The method of claim 8 wherein said inducing step comprises the step of inducing said electronic transition of BC to said excited state by means of light having a wavelength of about 900 to 120 nm.

10. The method of claim 9 wherein said inducing step comprises the step of laser-inducing said electronic transition of BC to said excited state.

11. The method of claim 9 wherein said inducing step comprises the step of inducing said electronic transition of BC to said excited state by means of a incandescent lamp equipped with an appropriate filter.

12. The method of claim 9 wherein said inducing step comprises the step of inducing said electronic transition of BC to said excited state by means of a fluorescent light equipped with an appropriate filter.

13. The method of claim 9 wherein said inducing step comprises the step of inducing said electronic transition of BC to said excited state by means of an arc lamp equipped with an appropriate filter.

14. A method of spectroscopically analysing a target gas, BC, in a mixture of gases, the steps of which comprise:

selecting a reagent ion, $X^+$, from the group consisting of cesium and sodium cations so that the electron affinity of $X^+$ is less than the ionization potential of any of the gases in said mixture, including BC;

selectively inducing an electronic transition of BC to an excited electronic state to produce $BC^*$ so that the ionization potential of $BC^*$ is less than the electron affinity of $X^+$;

colliding $X^+$ with $BC^*$ to produce $BC^+$ in accordance with the charge-transfer reaction:

$$X^+ + BC^* \rightarrow X + BC^+;$$

mass-spectroscopically analysing $BC^+$.

* * * * *